(12) United States Patent
Rose

(10) Patent No.: US 8,206,121 B2
(45) Date of Patent: Jun. 26, 2012

(54) METHOD OF RESTORING AN AIRFOIL BLADE

(75) Inventor: William M. Rose, Warren, MA (US)

(73) Assignee: United Technologies Corporation, Hartford, CT (US)

( * ) Notice: Subject to any disclaimer, the term of this patent is extended or adjusted under 35 U.S.C. 154(b) by 1356 days.

(21) Appl. No.: 12/055,348

(22) Filed: Mar. 26, 2008

(65) Prior Publication Data

US 2009/0246031 A1    Oct. 1, 2009

(51) Int. Cl.
*B23P 6/00* (2006.01)
(52) U.S. Cl. .................................. 416/229 A; 29/889.1
(58) Field of Classification Search .............. 416/229 A, 416/248, 213 R; 29/889.1
See application file for complete search history.

(56) References Cited

U.S. PATENT DOCUMENTS

| | | | |
|---|---|---|---|
| 4,726,104 A | 2/1988 | Foster et al. | |
| 4,873,751 A | 10/1989 | Walker et al. | |
| 5,360,961 A | 11/1994 | Ingall et al. | |
| 5,503,589 A | 4/1996 | Wikle | |
| 5,645,466 A | 7/1997 | Wikle | |
| 5,822,852 A | 10/1998 | Bewlay et al. | |
| 6,179,567 B1 | 1/2001 | Stauffer et al. | |
| 6,332,272 B1 | 12/2001 | Sinnott et al. | |
| 6,364,971 B1 | 4/2002 | Peterson, Jr. et al. | |
| 6,490,791 B1 | 12/2002 | Surace et al. | |
| 6,502,303 B2 | 1/2003 | Updegrove et al. | |
| 6,532,656 B1 | 3/2003 | Wilkins et al. | |
| 6,568,077 B1 * | 5/2003 | Hellemann et al. | 29/889.1 |
| 2005/0029235 A1 | 2/2005 | Mielke | |

FOREIGN PATENT DOCUMENTS

| | | |
|---|---|---|
| EP | 1153699 A2 | 11/2001 |
| EP | 1672170 A1 | 6/2006 |
| EP | 1688211 A2 | 8/2006 |
| EP | 1785583 A2 | 5/2007 |
| JP | 2002066745 | 3/2002 |
| JP | 2002066745 A * | 3/2002 |

OTHER PUBLICATIONS

Extended European Search Report for Application No. EP 09 25 0652 mailed May 13, 2009.
Khromchenko F A et al: "Technology of Repairing Working Blades of Steam Turbines. Part 1. Repair by the Method of Deposition of High-CR Alloys" Welding International, Taylor & Francis, Abingdon, GB, vol. 13, No. 5, Jan. 1, 1999; pp. 405-408; XP00824280, ISSN: 0950-7116.

* cited by examiner

*Primary Examiner* — Richard Edgar
(74) *Attorney, Agent, or Firm* — Carlson Gaskey & Olds, P.C.

(57) ABSTRACT

A method of repairing an airfoil blade involves the steps of providing an airfoil blade have a leading edge, a trailing edge, a tip and a base. A length of the airfoil blade is defined by the tip and the base and a width of the airfoil blade is defined by the leading edge and the trailing edge. A weld is made along a first direction of the length of the airfoil blade and then made in a second direction along the width of the airfoil blade to form a first weld layer. The first weld layer has a first portion extending across the length of the airfoil blade and a second portion extending across its width. A second weld layer is welded onto the first layer such that an end wall of the second weld layer abuts the second portion of the first weld layer.

18 Claims, 2 Drawing Sheets

METHOD OF RESTORING AN AIRFOIL BLADE

BACKGROUND OF THE INVENTION

This invention relates to a method for restoring an airfoil blade, such as for a gas turbine engine.

An airfoil blade for a gas turbine engine generally experiences wear during normal engine operation. To avoid buying a new airfoil blade, it may be desirable to restore the worn airfoil blade.

With reference to FIG. 1, there is shown a prior art technique for restoring airfoil blade 10. Airfoil blade 10 has leading edge 18 spaced from trailing edge 22 and tip 26 spaced from base 30. Length L is defined between tip 26 and base 30 while width W is defined between leading edge 18 and trailing edge 22. Generally, restoration of airfoil blade 10 involves machining away thin and worn surfaces from airfoil blade body 14 to form ledge 23 with curve 25, which extends from tip 26 to one of leading edge 18 or trailing edge 22. Substantially parallel weld layers 20 are then deposited on ledge 23 by welding, such as by laser powder fusion or plasma arc welding, in the direction of arrow A from tip 26 along length L of airfoil blade 10 to curve 25. Each weld layer 20 starts at tip 26 and ends at points 21 of curve 25. However, because welding of weld layers 20 is stopped at points 21 of curve 25, air foil body 14 may melt or burn in the areas around points 21 due to excess heat from welding. Consequently, these areas of airfoil blade 10 may require rework, such as additional welding and machining of these areas, which is very time-consuming.

A need therefore exists for an improved welding technique that eliminates the welding imperfection caused by localized melting at the point of contact of the weld layer with the airfoil blade body.

SUMMARY OF THE INVENTION

A method of repairing an airfoil blade involves the steps of providing an airfoil blade have a leading edge, a trailing edge, a tip and a base. A length of the airfoil blade is defined by the tip and the base and a width of the airfoil blade is defined by the leading edge and the trailing edge. A weld is made along a first direction of the length of the airfoil blade and then made in a second direction along the width of the airfoil blade to form a first weld layer. The first weld layer has a first portion extending across the length of the airfoil blade and a second portion extending across its width. A second weld layer is welded onto the first layer such that an end wall of the second weld layer abuts the second portion of the first weld layer.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
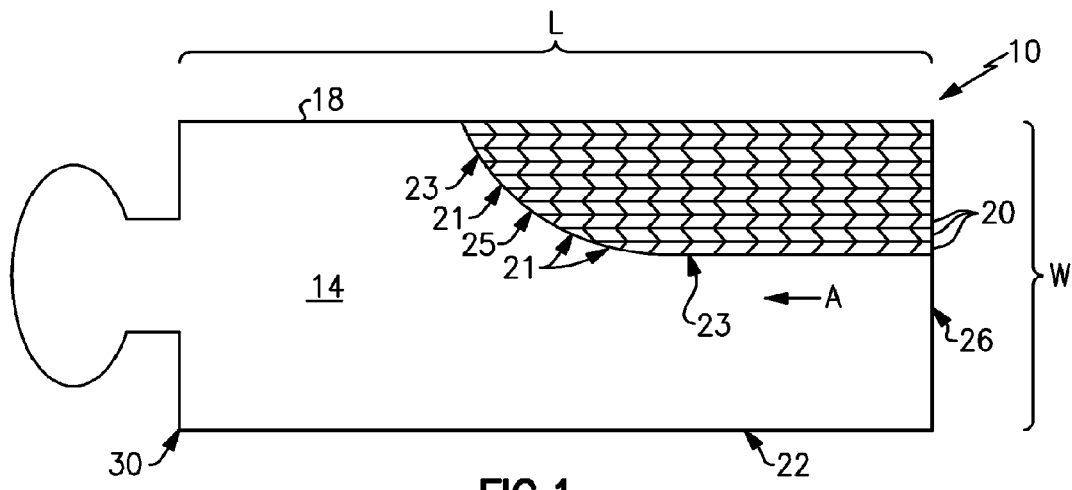
FIG. 1 illustrates a prior art welding technique for restoring an airfoil blade.
Figure 2:
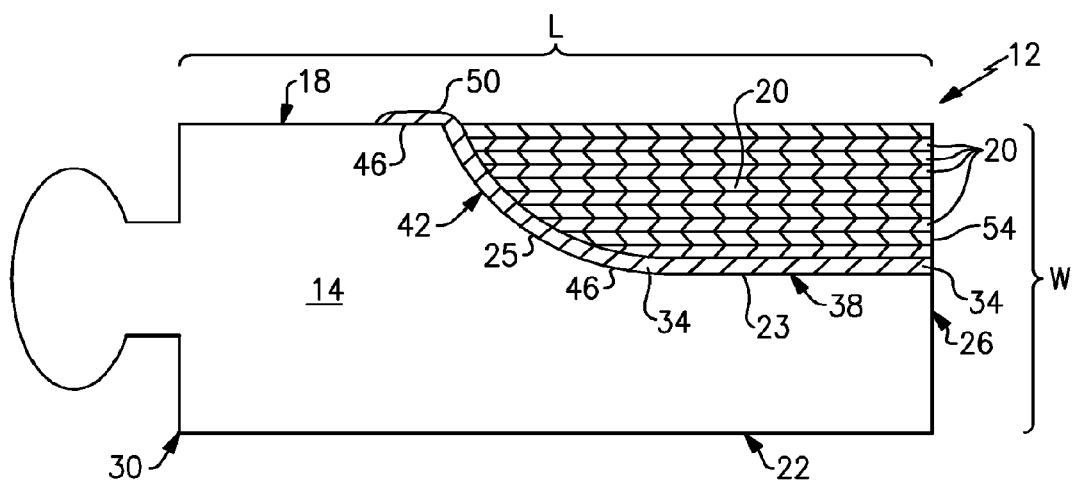
FIG. 2 illustrates an exemplary welding method for restoring an airfoil blade.

With reference to FIG. 2, the exemplary method for welding facilitates avoiding the foregoing problems of the prior art by creating first weld layer 34 that extends substantially across ledge 23 and curve 25. In other words, first weld layer 34 extends substantially across an entire length L and width W of exemplary airfoil blade 12. Weld layers 20 are then deposited on first weld layer 34 such that each weld layer 20 terminates on first weld layer 34 rather than airfoil blade 12. As a result, first weld layer 34 acts as a heat buffer to absorb excess heat along curve 25 from subsequent welds as will be explained.

Figure 3:
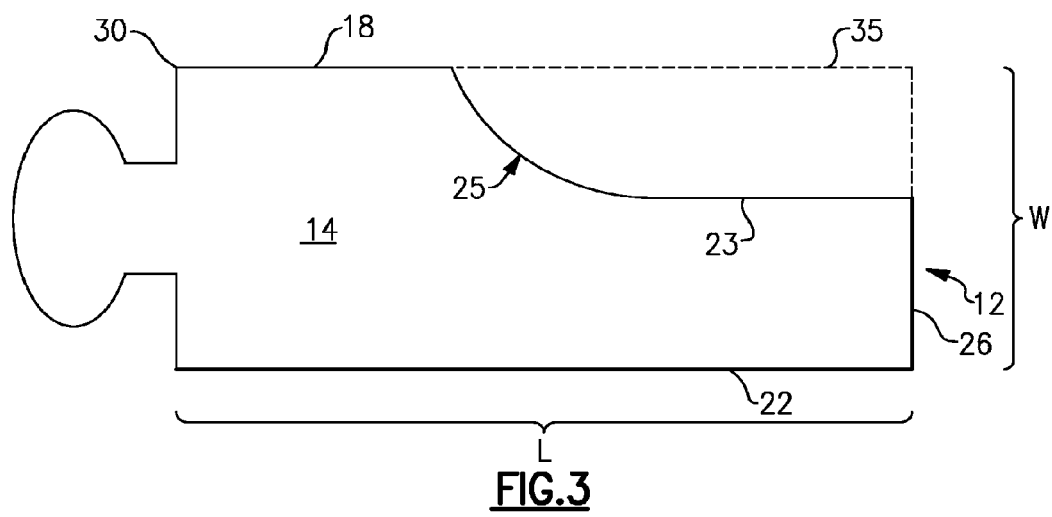
FIG. 3 illustrates part of the process of the inventive technique of FIG. 2.

With reference to FIG. 3, there is shown airfoil blade 12 including airfoil blade body 14 with worn portion 35 designated by dashed lines. Through machining, worn portion 35 is removed from airfoil blade 12 to create ledge 23, including curve 25, atop which weld layers will be provided to restore length L and width W of airfoil blade 12.

Figure 4:
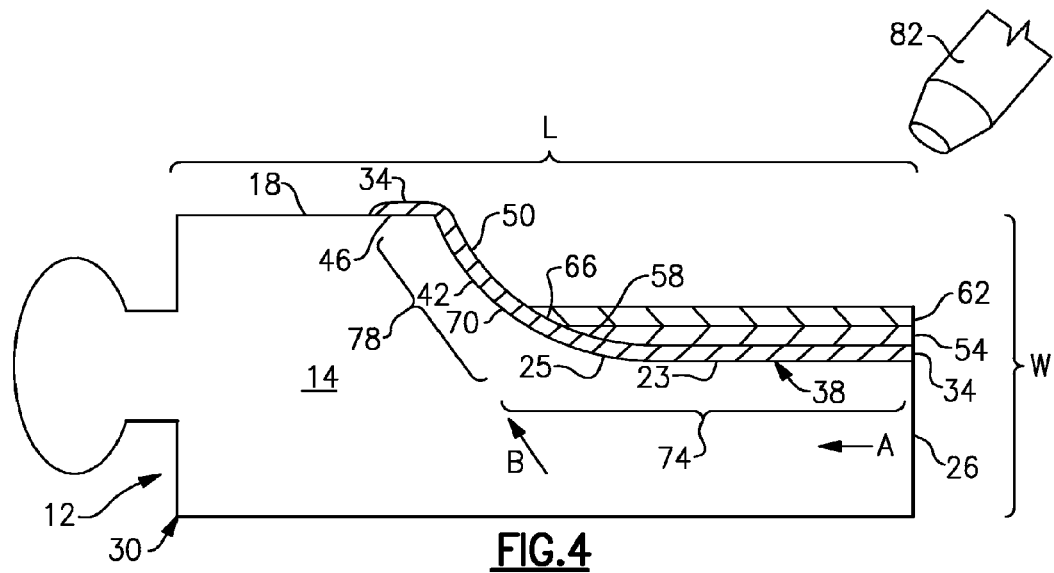
FIG. 4 illustrates another step in the process of the inventive welding technique, showing a formation of a first welding layer and additional layers atop the first welding layer.

With reference to FIG. 4, first weld layer 34 is created by welding on ledge 23 from tip 26 towards base 30 by moving weld gun 82 in the direction of arrow A along length L of airfoil blade 12. At curve 25, welding gun 82 is then moved in the transverse direction of arrow B to follow curve 25 of ledge 23 across width W of airfoil blade 12. Welding gun 82 continues welding across an edge, such as leading edge 18, of airfoil blade 12. Welding gun 82 remains active to weld in a single pass first weld layer 34 from tip 26 across leading edge 18. Although weld formation is described with reference to moving weld gun 82 with respect to airfoil blade 12, it should be appreciated by one of ordinary skill in the art that airfoil blade 12 may be moved with respect to welding gun 82 while achieving similar results.

First weld layer 34 includes first portion 38 and second portion 42 that together form a curve. First portion 38 extends generally along length L of airfoil blade 12 and restores portion 74 of length L of airfoil blade 12. Second portion 42 extends generally along width W of airfoil blade 12 and restores portion of width 78 of airfoil blade 12. First weld layer 34 has first surface 46 in contact with airfoil blade body 14 and second surface 50 spaced away from first surface 46.

Figure 5:
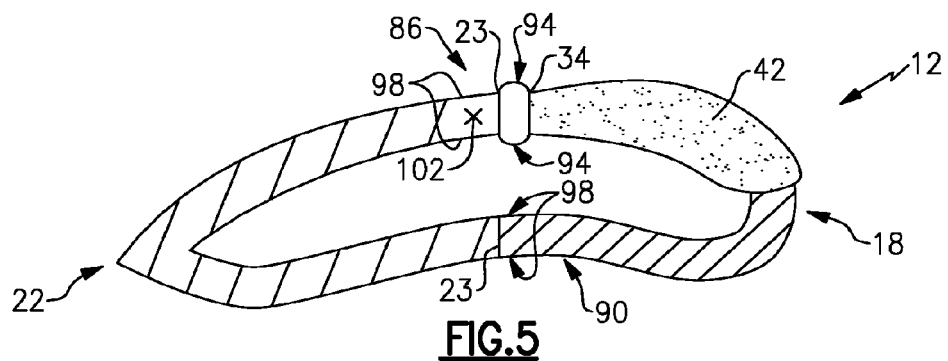
FIG. 5 illustrates a cross-sectional view of the airfoil blade of FIG. 4, showing a thickness of the first weld layer greater than a thickness of a wall of the airfoil blade.

FIG. 5 shows a cross-sectional view of airfoil blade 12 including first weld layer 34, as shown from the direction of arrow A of FIG. 4. Airfoil blade 12 includes suction side wall 86 and pressure side wall 90 having wall thickness 98. First weld layer 34 is formed having first weld layer thickness 94, which is greater than wall thickness 98 of suction sidewall 86 at location 102. As a result, first weld layer 34 is thick enough to absorb excess heat from welding gun 82 to facilitate avoiding localized melting or damage of airfoil blade 12.

Following formation of first weld layer 34, weld gun 82 is brought back to tip 26 of airfoil blade 12. Weld gun 12 then welds in the direction of arrow A to create second weld layer 54 so that end wall 58 of second weld layer 54 abuts second surface 50 of first weld layer 34. By terminating second weld layer 54 at first weld layer 34 instead of airfoil blade 12, excess heat may be absorbed by first weld layer 34 so as to facilitate avoiding blade damage. A third weld layer 62 is also created by welding in the same manner and same direction as the second weld layer 54. Third weld layer 62 is formed so that end wall 66 of third weld layer 62 abuts second surface 50 of first weld layer 34. As also shown in FIG. 4, the third weld layer 62 extends closer to the base 30 of the airfoil blade 12 than the second weld layer 54. Welding gun 82 continues to create weld layers like second weld layer 54 and third weld layer 62 up to leading edge 18 as shown in FIG. 2, with each weld layer starting at tip 26 and terminating at second surface 50 of first weld layer 34. Following this welding process, airfoil blade 12 may then be machined so that airfoil blade 12 conforms to its original dimensions.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

I claim:

1. A method of repairing an airfoil blade, comprising the steps of:
   (A) providing the airfoil blade having a leading edge, a trailing edge, a tip and a base, a length of the airfoil blade defined by the tip and the base and a width of the airfoil blade defined by the leading edge and the trailing edge;
   (B) welding in a first direction along the length of the airfoil blade and welding in a second direction transverse to the first direction and along the width of the airfoil blade to form a first weld layer having a first portion extending across the length and a second portion extending across the width to restore at least a portion of the length and a portion of the width of the air foil blade;
   (C) welding a second weld layer on to the first weld layer such that an end wall of the second weld layer abuts the second portion of the first weld layer; and
   (D) welding a third weld layer on to the second weld layer such that an end wall of the third weld layer abuts the second portion of the first weld layer.

2. The method of claim 1 wherein the second portion extends to one of the leading edge and the trailing edge of the airfoil blade.

3. The method of claim 1 wherein the first weld layer is formed in a single pass.

4. The method of claim 1 wherein the first portion and the second portion of the first weld layer form a curve.

5. The method of claim 1 wherein the airfoil blade has a suction side wall and a pressure side wall, wherein the first weld layer is formed having a first weld layer thickness greater than a wall thickness of one of the suction side wall and the pressure side wall at a location of the airfoil blade neighboring the first weld layer.

6. The method of claim 1 including the step of:
   removing a portion of the airfoil blade prior to step (B) to accommodate the first weld layer.

7. The method of claim 1 including the step of:
   machining a portion of at least one of the first weld layer and the second weld layer.

8. A method of repairing an airfoil blade, comprising the steps of:
   (A) providing the airfoil blade having a leading edge, a trailing edge, a tip and a base, a length of the airfoil blade defined by the tip and the base and a width of the airfoil blade defined by the leading edge and the trailing edge;
   (B) welding in a first direction along the length of the airfoil blade and welding in a second direction along the width of the airfoil blade to form a first weld layer having a first portion extending across the length and a second portion extending across the width to restore at least a portion of the length and a portion of the width of the air foil blade wherein the first weld layer has a first surface in contact with the airfoil blade and a second surface;
   (C) welding a second weld layer on to the first weld layer such that an end wall of the second weld layer abuts the second portion of the first weld layer on the second surface of the first weld layer; and
   (D) welding a third weld layer on to the second weld layer such that an end wall of the third weld layer abuts the second portion of the first weld layer on the second surface of the first weld layer.

9. The method of claim 8 wherein the second portion extends to one of the leading edge and the trailing edge of the airfoil blade.

10. The method of claim 9 wherein the first weld layer is formed across one of the leading edge and the trailing edge along the length of airfoil blade.

11. The method of claim 8 wherein the first weld layer is formed in a single pass.

12. The method of claim 8 wherein the first portion and the second portion of the first weld layer form a curve.

13. The method of claim 8 wherein the airfoil blade has a suction side wall and a pressure side wall, wherein the first weld layer is formed having a first weld layer thickness greater than a wall thickness of one of the suction side wall and the pressure side wall at a location of the airfoil blade neighboring the first weld layer.

14. The method of claim 8 including the step of:
    (E) removing a portion of the airfoil blade prior to step (B) to accommodate the first weld layer.

15. The method of claim 8 including the step of:
    (E) machining a portion of at least one of the first weld layer and the second weld layer.

16. An airfoil blade, comprising:
    an airfoil body having a leading edge, a trailing edge, a tip and a base, a length of said airfoil body defined by said tip and said base and a width of said airfoil body defined by said leading edge and said trailing edge;
    a first weld layer having a first portion extending across said length and a second portion extending across said width restoring at least a portion of said length and a portion of said width of said air foil blade wherein said first weld layer has a first surface in contact with said airfoil blade and a second surface spaced from said first surface;
    a second weld layer disposed on said first weld layer such that an end wall of said second weld layer abuts said second portion of said first weld layer on said second surface of said first weld layer; and
    a third weld layer disposed on to said second weld layer such that an end wall of said third weld layer abuts said second portion of said first weld layer on said second surface of said first weld layer.

17. The airfoil blade of claim 16 wherein said first portion and said second portion of said first weld layer forms a curve.

18. A method of repairing an airfoil blade, comprising the steps of:
    (A) providing the airfoil blade having a leading edge, a trailing edge, a tip and a base, a length of the airfoil blade defined by the tip and the base and a width of the airfoil blade defined by the leading edge and the trailing edge;
    (B) welding in a first direction along the length of the airfoil blade and welding in a second direction transverse to the first direction and along the width of the airfoil blade to form a first weld layer having a first portion extending across the length and a second portion extending across the width to restore at least a portion of the length and a portion of the width of the air foil blade;
    (C) welding a second weld layer on to the first weld layer such that an end wall of the second weld layer abuts the second portion of the first weld layer; and
    (D) welding a third weld layer on to the second weld layer such that the third weld layer extends closer to the base of the airfoil blade than the second weld layer.

* * * * *